(12) United States Patent
Pragides et al.

(10) Patent No.: US 9,535,967 B2
(45) Date of Patent: Jan. 3, 2017

(54) METHOD AND SYSTEM FOR PROVIDING EFFICIENT AND COMPLEX DATABASE FUNCTIONALITY TO A MOBILE DEVICE

(75) Inventors: Ron Pragides, San Francisco, CA (US); Simon Fell, Corte Madera, CA (US); Jason Schroeder, Los Angeles, CA (US); Pierpaolo Bergamo, Venice, CA (US); Allen Wittman, San Francisco, CA (US); Siddhartha Singh, San Francisco, CA (US); Deepak Kothule, Culver City, CA (US); Jason McDowall, El Segundo, CA (US)

(73) Assignee: salesforce.com, inc., San Francisco, CA (US)

( * ) Notice: Subject to any disclaimer, the term of this patent is extended or adjusted under 35 U.S.C. 154(b) by 1054 days.

(21) Appl. No.: 12/557,094

(22) Filed: Sep. 10, 2009

(65) Prior Publication Data

US 2010/0077468 A1  Mar. 25, 2010

Related U.S. Application Data

(60) Provisional application No. 61/095,872, filed on Sep. 10, 2008.

(51) Int. Cl.
*G06F 17/30* (2006.01)
*H04L 9/32* (2006.01)
*H04L 29/08* (2006.01)

(52) U.S. Cl.
CPC ....... *G06F 17/30572* (2013.01); *H04L 9/3226* (2013.01); *H04L 9/3234* (2013.01); *H04L 67/26* (2013.01); *H04L 67/36* (2013.01); *H04L 67/101* (2013.01); *H04L 67/1002* (2013.01); *H04L 2209/56* (2013.01); *H04L 2209/60* (2013.01); *H04L 2209/80* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

*Primary Examiner* — Tyler Torgrimson
(74) *Attorney, Agent, or Firm* — Dergosits & Noah LLP; Todd A. Noah

(57) ABSTRACT

Methods, systems, and apparatus provide efficient and complex database functionality for an electronic device, e.g. a mobile device. These mechanisms and methods for providing efficient and complex database functionality to an electronic device can enable embodiments to provide quick access to certain data using a local application and seamless access within the local application to other data and complex presentation formats that are supplied by a server. The ability of embodiments to provide this hybrid functionality can enable users of the electronic devices to be more productive.

20 Claims, 9 Drawing Sheets

(56) References Cited

U.S. PATENT DOCUMENTS

| | | |
|---|---|---|
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,713 B1* | 4/2004 | Beach et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,401,094 B1 | 7/2008 | Kesler |
| 7,620,655 B2 | 11/2009 | Larsson |
| 7,698,160 B2 | 4/2010 | Beaven et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0120752 A1* | 6/2003 | Corcoran ............... 709/219 |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015504 A1* | 1/2004 | Ahad et al. ............... 707/100 |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0236726 A1* | 11/2004 | Ewing et al. ............... 707/3 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0047847 A1* | 3/2006 | Saccocio ............... 709/235 |
| 2006/0094354 A1* | 5/2006 | Munje et al. ............... 455/39 |
| 2008/0065617 A1* | 3/2008 | Burke ............... G06F 17/30646 |
| 2008/0183868 A1* | 7/2008 | Singh et al. ............... 709/225 |
| 2008/0263153 A1* | 10/2008 | Reshef et al. ............... 709/203 |
| 2008/0313260 A1* | 12/2008 | Sweet et al. ............... 709/201 |
| 2009/0063415 A1 | 3/2009 | Chatfield et al. |
| 2009/0138948 A1* | 5/2009 | Calamera et al. ............... 726/6 |

* cited by examiner

METHOD AND SYSTEM FOR PROVIDING EFFICIENT AND COMPLEX DATABASE FUNCTIONALITY TO A MOBILE DEVICE

CROSS-REFERENCE TO RELATED APPLICATIONS

This application claims priority from U.S. Provisional Patent Application No. 61/095,872, filed Sep. 10, 2008, entitled "METHOD AND SYSTEM FOR PUSHING DATA FROM AN ON-DEMAND SERVICE TO A PLURALITY OF DEVICES," which is hereby incorporated by reference, as if set forth in full in this document, for all purposes.

The present application is related to the following commonly assigned U.S. patent application Ser. No. 11/757,087 entitled "METHOD AND SYSTEM FOR PUSHING DATA TO A PLURALITY OF DEVICES IN AN ON-DEMAND SERVICE ENVIRONMENT," by Weissman et al., filed Jun. 1, 2007, which is incorporated herein by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to displaying data stored in an on-demand database on a mobile device, and more particularly to providing efficient and complex database functionality to a mobile device.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The rapid and efficient retrieval of accurate information and subsequent delivery of this information to the user system in a transparent manner that is easy to understand is desirable.

Unfortunately, conventional database approaches might process a query relatively slowly and become inefficient if, for example, the number of queries received by the database system is relatively high. A database system may also process a query relatively slowly if, for example, a relatively large number of users substantially concurrently access the database system. In addition, when the user systems are mobile devices, the display of data may be further slowed, for example, when a query and display of the data is complex.

Accordingly, it is desirable to provide techniques enabling an efficient pushing of data to a plurality of devices that use the database system.

BRIEF SUMMARY

In accordance with embodiments, there are provided mechanisms and methods for providing efficient and complex database functionality to an electronic device. These mechanisms and methods for providing efficient and complex database functionality to an electronic device can enable embodiments to provide quick access to certain data using a local application and seamless access within the local application to other data and complex presentation formats that are supplied by a server. The ability of embodiments to provide this hybrid functionality can enable users of the electronic devices to be more productive. Certain embodiments are well suited for mobile devices.

In an embodiment and by way of example, a method for obtaining, with an electronic device, access to data that is stored on a database is provided. The electronic device receives a first set of data from a server of the database. The first set of data is stored in a memory of the electronic device. A local application running on the electronic device provides an application screen including a display page that displays at least a portion of the first set of data. The application screen includes one or more server activation objects, which may be selected. In response to a selection, a request is sent to the database server for a new display page. The new display page is created by the database server and includes a second set of data that is stored at the database server. The new display page is received from the database server and displayed on the electronic device.

In another embodiment and by way of example, a method of providing, to an electronic device, access to data that is stored on a database is provided. A server of the database pushes a first set of data to a local application running on the electronic device for display by the local application. The local application receives a request to the database server for a new display page. The database server creates the new display page. The new display page includes a second set of data that is stored at the database server. The server then sends the new display page to the electronic device.

In another embodiment and by way of example, a method of obtaining, with an electronic device, access to data that is stored on a database is provided. The electronic device receives a first set of data from a first server of the database. The first set of data is stored in a memory of the electronic device. A local application running on the electronic device provides an application screen including a detail page that displays at least a portion of the first set of data. The detail page is associated with a first data object stored on the database. The detail page includes one or more server activation objects, which may be selected. In response to a selection, a request for a new detail page is provided to a second server associated with the selected server activation object. A portion of the first set of data that is associated with the first data object is uploaded to the second server with or as part of the request. The new detail page is received from the second server and includes information associated with the first data object. The new detail page is then displayed on the electronic device.

Other embodiments of the invention are directed to systems and machine-readable media associated with methods described herein.

While the present invention is described with reference to an embodiment in which techniques for providing efficient and complex database functionality to an electronic device are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2®, by IBM and the like without departing from the scope of the embodiments claimed.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Systems and methods are provided for efficient and complex database functionality for an electronic device (e.g. a mobile device). Mobile devices work most efficiently when the data is stored locally on the device. However, for a large database such storage is not practical. Additionally, the analysis of the database can be quite taxing on a mobile device, which typically has relatively low computational power. Accordingly, embodiments provide a hybrid application that accesses local data for many basic tasks (especially those tasks for which the data is accessed often) while providing a seamless interface with a database server that can provide additional functionality. A result can be a hybrid application that appears to run completely locally.

Embodiments provide an application screen of a local application, where the application screen has server activation objects. These objects are part of the local application, but they can operate to provide a function call (e.g. an HTTP request) to the database server. This function call may be to a URL and can include data that is used by the database in providing a display page that is sent to the electronic device.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term mobile device refers to the types of devices with a small form factor, limited interactive capability, limited display size, limited memory or storage capacity, limited processing power, and/or short battery life. Such devices include notebook/netbook computers, phones, media players, and the like. As used herein, the term application screen includes any part of a viewing area of an electronic device to which an application can provide the display. As used herein, the term local application is an application that is executed on a processor of an electronic device, which may be in communication with servers via a network.

Next, mechanisms and methods for providing efficient and complex database functionality for a mobile device in an on-demand service environment will be described with reference to example embodiments.

System Overview

Figure 1:
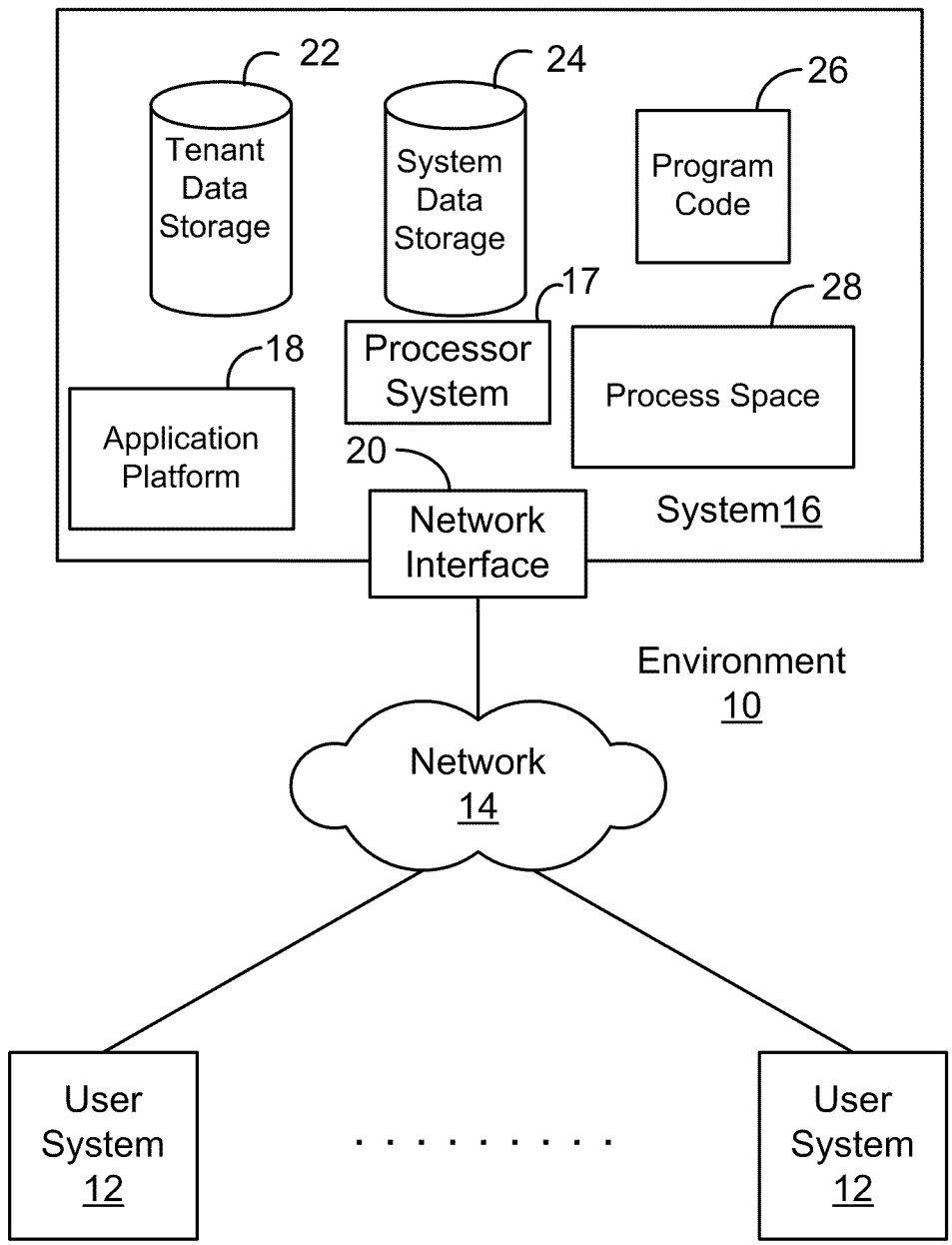
FIG. 1 illustrates a block diagram of an example of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. In one aspect, embodiments are particularly well suited for user systems 12 that are mobile devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object; however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
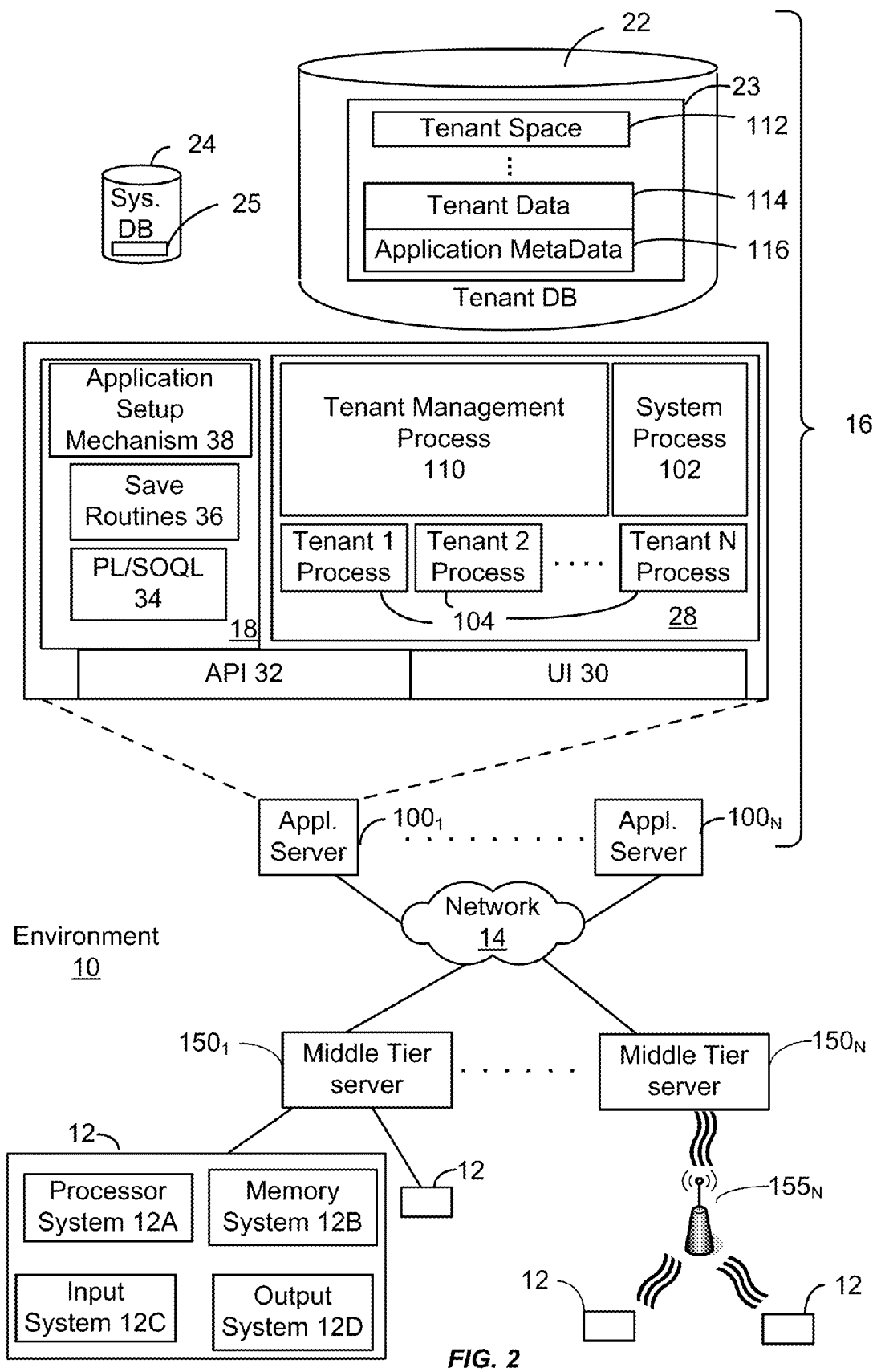
FIG. 2 illustrates a block diagram of an embodiment of elements of FIG. 1 and various possible interconnections between these elements.

FIG. 2 illustrates a block diagram of an embodiment of elements and various possible interconnections between these elements. In the embodiment illustrated by FIG. 2, one or more middle tier servers 150 exist between system 16 and user systems 12. Middle tier servers 150 are termed middle tier because these servers are interposed between the system 16 and the user systems of a particular organization. As described above, network 14 may be used for communication between system 16 and system 12. In one embodiment, the same network 14 is used between middle tier servers 150 and user systems 12. In another embodiment, a different network is used between a middle tier server 150 and user systems 12. For example, a tenant network $155_N$ may be a wireless network, and network 14 may provide communication coupling via fiber-optics. Each network 14 or tenant network $155_N$ may also be a combination of different types and protocols.

In one embodiment, each middle tier server 150 manages data of a different organization or tenant, however other embodiments may include information of more than one tenant coupled to a single middle tier server. In another embodiment, each middle tier server 150 may contain a plurality of servers, which collectively provide communication between system 16 and user systems 12 of an organization. The tenant network 155 of each organization may be of a different type (e.g. wireless, optical, . . . ) or protocol. Examples of wireless protocols include Wireless LAN, Global System for Mobile Communications (GSM), Personal Communications Service (PCS), D-AMPS, Wi-Fi, General Packet Radio Service (GPRS), 3G wireless systems such as those using Code division multiple access (CDMA), High Performance Radio LAN (HIPERLAN), and Worldwide Interoperability for Microwave Access (WiMAX).

Additionally, FIG. 2 further illustrates elements of system 16 and various interconnections. FIG. 2 shows that user system 12 may include processor system 12A, memory system 12B, input system 12C, and output system 12D. As shown in FIG. 2, network 14 couples user systems 12 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110, for example. Invocations to such applications may be coded using PL/SOQL 34 that provides a programming language style interface extension to API 32. A detailed description of some PL/SOQL language embodiments is discussed in commonly owned U.S. Provisional Patent Application 60/828, 192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 100$_1$ might be coupled via the network 14 (e.g., the Internet), another application server 100$_{N-1}$ might be coupled via a direct network link, and another application server 100$_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) and/or middle tier servers 150 communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The following detailed description will first describe the pushing of data to a mobile device and the operation of a local application running on the mobile device to analyze and view the pushed data in accordance with aspects and embodiments of the present invention. Embodiments for providing complex database functionality to a mobile device is then detailed. Following this, examples of authentication methods used in providing the complex functionality are described.

Using Local Application to View Data from Database

In order to provide quick access to the data, some embodiments can push data from an application server (e.g. server 100) to an electronic device (e.g. user system 12), which may be a mobile device. Such pushing may occur, e.g., at periodic times or based on a location of the mobile device. In this manner, the user of the mobile device can have quick access to the data. However, the mobile device is limited in the processing power and data storage capabilities. For example, dashboards are difficult to provide on a mobile device.

These techniques for pushing data can enable embodiments to maintain quasi-identical copies of information stored at a multi-tenant database system, for example, at devices constrained by one or more of storage capacity, display size, network limit, any combination thereof or other constraints, as is common for a mobile device. Maintaining a quasi-identical copy can provide users with a significant portion of the data the user is likely to need to conduct their business without imposing undue burdens on the database system by relieving the need for display or storage or other constrained devices to continuously interrogate the database system for fresh data. Examples of methods for pushing data to electronic devices can be found in commonly assigned U.S. patent application Ser. No. 11/757,087, which is incorporated by reference.

Once the data is stored locally on a mobile device, the user can access the data with an application running locally. However, the needed data will not always be pushed to the mobile device before the user needs the data. Accordingly, embodiments provide access to the local data and to data on the server.

Figure 3:
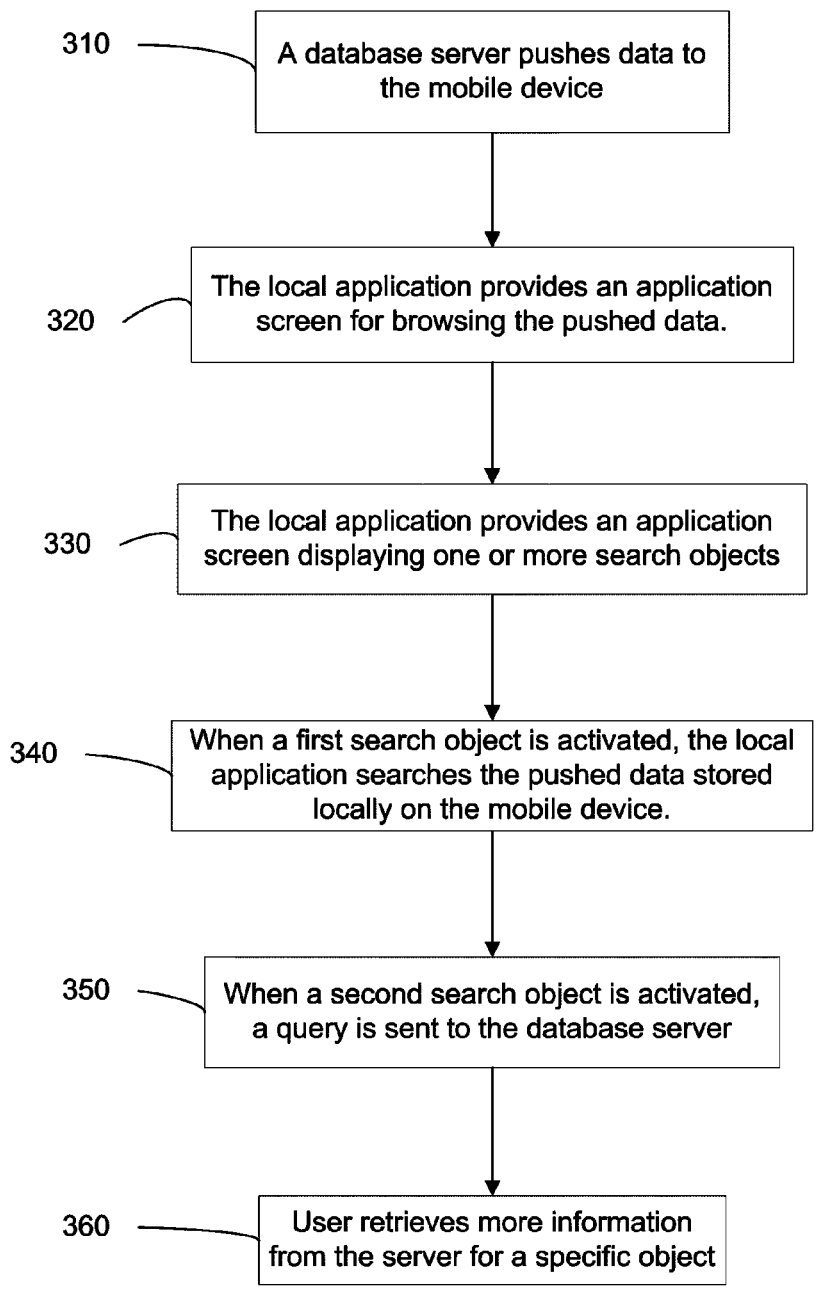
FIG. 3 is a flow chart illustrating a method 300 of providing access to data stored locally on the mobile device and access to data stored on an on-demand database according to embodiments of the present invention.

FIG. 3 is a flow chart illustrating a method 300 of providing access to data stored locally on the mobile device and access to data stored on an on-demand database according to embodiments of the present invention. Although method 300 is presented in connection with a mobile device, other types of electronic devices may be used.

In step 310, the database server pushes data to the mobile device by the database server. In one embodiment, the data relates to objects (such as Accounts and Opportunities) stored on the database server. Once stored on the mobile device, a local application running on one or more of the mobile devices may be used to analyze and view the data.

In step 320, the local application provides an application screen for browsing the pushed data. For example, the application screen can display a listing of all or a portion (e.g. only accounts) of the records (also referred to as objects) that the pushed data represents or that is associated with the data. In one embodiment, the screen for browsing the pushed data is a default or home screen that is displayed when a user first starts the application. In some embodiments, a user can change the default screen.

Figure 4A:
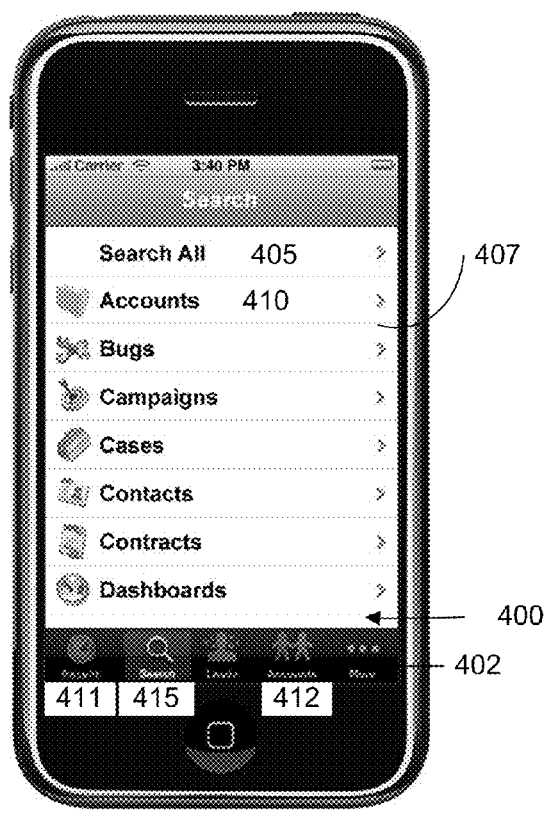
FIG. 4A shows an example of an application screen that may be browsed to find desired data.

FIG. 4A shows an example of an application screen 400 that may be browsed to find desired data. For example, an Accounts object 410 may be selected to provide a listing of accounts found on the mobile device. The application screen 400 includes a display page 407, which can change based on an action by a user of the mobile device, and a control tab bar 402, which can stay the same when the display page 407 changes. In some embodiments, it is possible that not all of display page 407 are displayed at one time. In such embodiments, the rest of display page 407 may be accessed by a user by, for example, scrolling down by pushing a button or sliding a finger down the screen.

In another embodiment, an Accounts tab 412 may be selected to obtain a listing of the accounts. In yet another embodiment, application screen 400 can show the last 25 records viewed from across different types of objects. A Recent tab 411 may be used to access the most recent records. In one aspect, recent tab 411 can stay highlighted if the tab is presently viewable in tab bar 402.

Referring back to method 300, in step 330, the local application provides an application screen displaying one or more search objects. For example, FIG. 4A shows a Search All button 405 and a Search tab 415.

In step 340, when a first search object is activated, the local application searches the pushed data stored locally on the mobile device. The first search object may be activated in numerous ways, such as by tapping with an external element (e.g. a finger or stylus) or a pointing element (e.g. a mouse or roller ball). The data may be stored in a local memory of the mobile device (e.g. flash memory, DRAM, or other suitable memory of the mobile device).

Figure 4B:
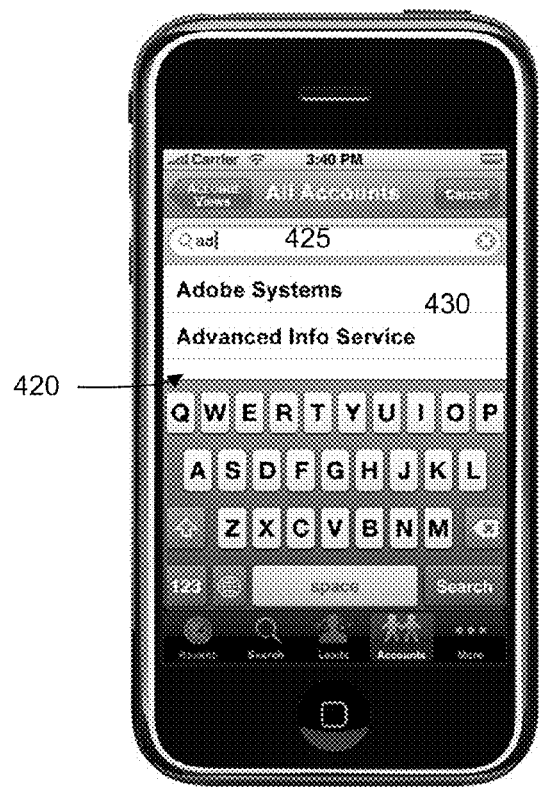
FIG. 4B shows an example of an application screen having a first search object, which searches the data stored locally.

FIG. 4B shows an example of an application screen 420 having a first search object 425, which searches the data stored locally. As shown, search object 425 is a text box for entering keywords used in the search. In one embodiment, when the user types text, display page 430 shows a list of records that match the text entered up to that point. In other words, the local application filters records on the device as a user types. While the user is typing in search object 425, the tab bar may be removed so there is room to view the filter options.

When a user exits from the text input mode, the tab bar can come back. In another embodiment, the display page 430 does not perform this filtering until another object is selected, e.g., an enter key.

In one embodiment, application screen 420 is provided when a user selects the Accounts object 410. In this embodiment, the search can only be performed on the account objects of the pushed data. A full listing of the account records can be provided along with an empty search box 425 once the Accounts object 410 is selected. In one aspect, the search box 425 may appear automatically. In another aspect, the search box 425 may appear after a selection by the user, e.g., by selecting a button. In another embodiment, when the Search All object 405 is selected, a similar display page may be provided, but the search is performed on all of the pushed data.

Records that match the search may be selected on the display page 430. In some embodiments, tapping on the record name will slide the screen to the right to show a record detail page. In one embodiment, if a user drills down to a record, it will be kept stored on the device. In another embodiment, if there are more than two full screens in the list page, a switch (automatic or initiated by a user) from a simple list view to an index view may be made. Once there are search results in the display page 430, if a user taps in the search box 425, a dark mask can cover over the results list. If a user types something else, but decides to cancel (e.g. by clicking in the mask area), then the user gets the previous results on the display page 430.

Referring back to method 300, in step 350, when a second search object is activated, a query is sent to the database server. For instance, activation of the search tab 415 of FIG. 4A may provide a search box whose entered contents are sent to the server (e.g. when an enter button is selected). In another embodiment, activation of the search tab 415 can send the contents of the already displayed search box to the server.

Figure 4C:
FIG. 4C shows an example of an application screen having a second search object, which may be used in performing a search of the database.

FIG. 4C shows an example of an application screen 450 having a second search object 455, which may be used in performing a search of the database. In one embodiment, tapping on the Search Server link 455 at the bottom of the results provides a query to the server, e.g., using the text in box 460.

In one embodiment, the local application receives a query entered into a text box and sends the query to the server. In one aspect, the sending of the query is performed using short message service (SMS). The SMS message can include the query and authentication information, which can be used to check whether the query is being received from an authorized user.

In some embodiments, the second object is the first object. For example, the first (local) search object 425 can filter a list on the device first, and then provide the query to the server. In one embodiment, the query is sent to the server when no results are returned from the local search. Alternatively, search object 425 can have its contents sent to the server when the second search object 455 is activated.

Referring back to method 300, in step 360, a user can retrieve more information from the server for a specific record. For example, if a user selects a record that has just a little bit of associated data found locally, a selection of the record can send a request for more of the associated data. In another embodiment, if only a portion of a list of data for the record is stored locally, an object may be made available to request the full list of the data.

Figure 4D:
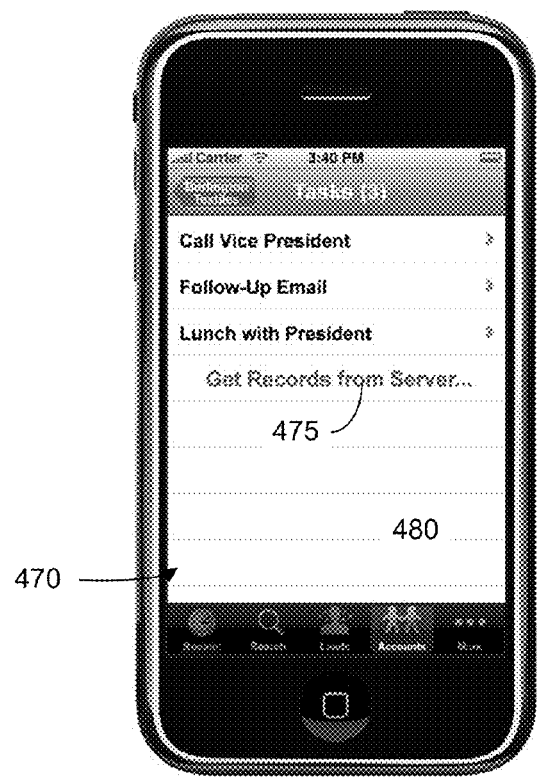
FIG. 4D shows an example of an application screen having a retrieval object, which may be used in retrieving record-specific data from the database server.

FIG. 4D shows an example of an application screen 470 having a retrieval object 475, which may be used in retrieving record-specific data from the database server. The "Get Records from Server" link 475 may be used to get a full list of records or other data on the display page 480. For example, the link 475 may be used to download any other tasks that have not already been pushed to the mobile device.

Although greater efficiency can be achieved by having data of some records on the device while also providing the ability to search data on the server, other embodiments can provide additional functionality.

Hybrid Local Application

To provide greater functionality, some embodiments can seamlessly combine offline (local processor) and online (server processor) access into a single hybrid application. As the processor and memory of the mobile device is limited, the local application has certain limitations in its ability to create any type of display pages. For example, the local application may have a limited ability to show pictures, graphs of data, and customized layouts for particular organizations. Some embodiments can provide additional functionality by having the server create a display page and send the created display page to the mobile device.

Figure 5:
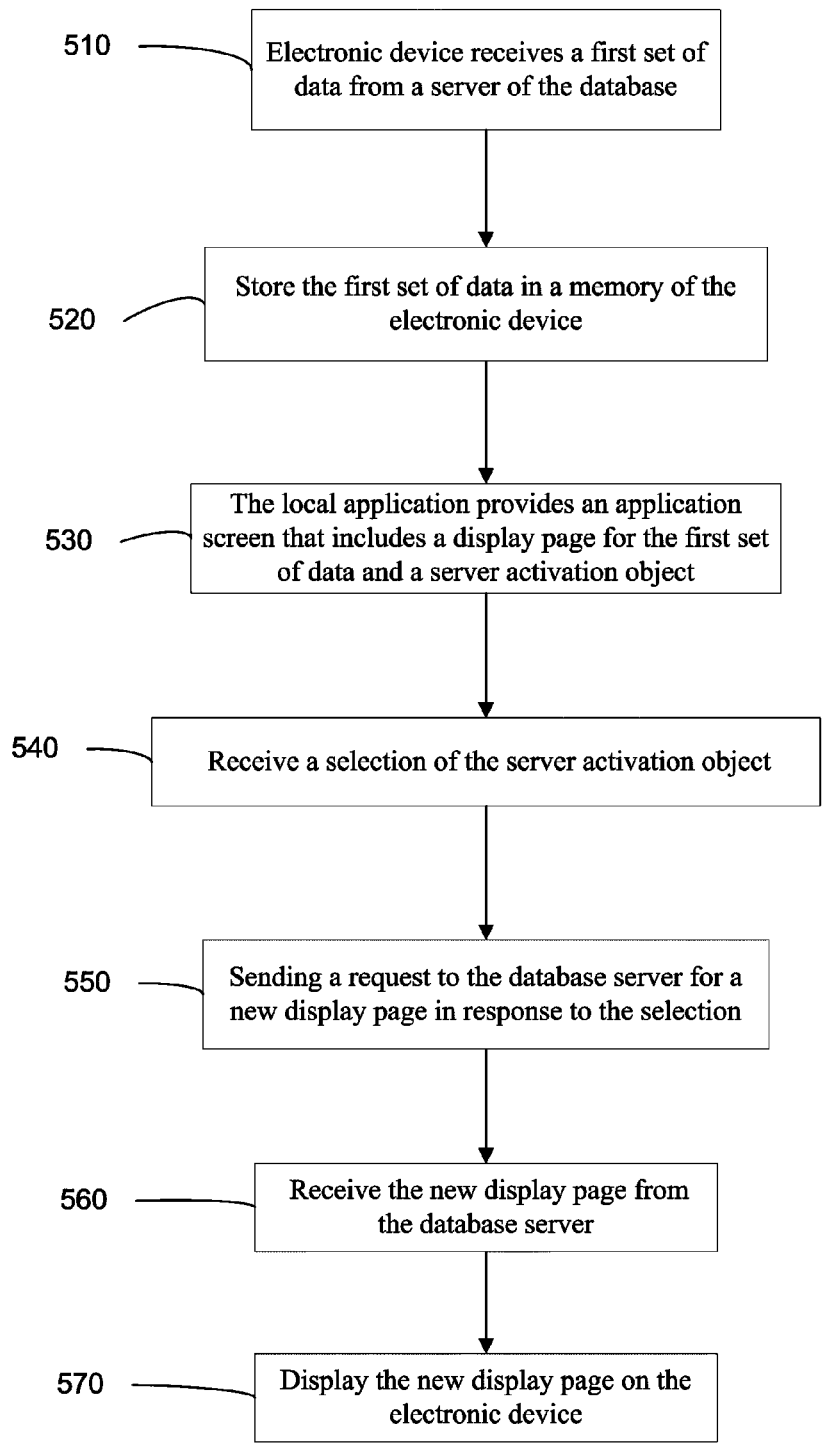
FIG. 5 is a flow chart illustrating a method of obtaining, with an electronic device, access to data that is stored on a database according to embodiments of the present invention.

FIG. 5 is a flow chart illustrating a method 500 of obtaining, with an electronic device, access to data that is stored on a database according to embodiments of the present invention. In one aspect, method 500 describes actions that can occur at the electronic device. Other actions that are performed at a server are also described.

In step 510, the electronic device receives a first set of data from a server of the database. In one embodiment, the data is pushed to the electronic device by a server of the database, e.g., using methods described above. In another embodiment, the first set of data can be received over various types of networks.

In step 520, the first set of data is stored in a memory of the electronic device. In various embodiments, the memory can be flash memory, a hard drive, DRAM, or other suitable memory circuit, or any combination thereof.

In step 530, the local application provides an application screen that includes a display page showing at least a portion of the first set of data. The application screen also includes at least one server activation object. In one embodiment, the server activation object is part of the display page. In another embodiment, the server activation object is provided on another part of the application screen. The local application executes on one or more processors of the electronic device.

Figure 6C:
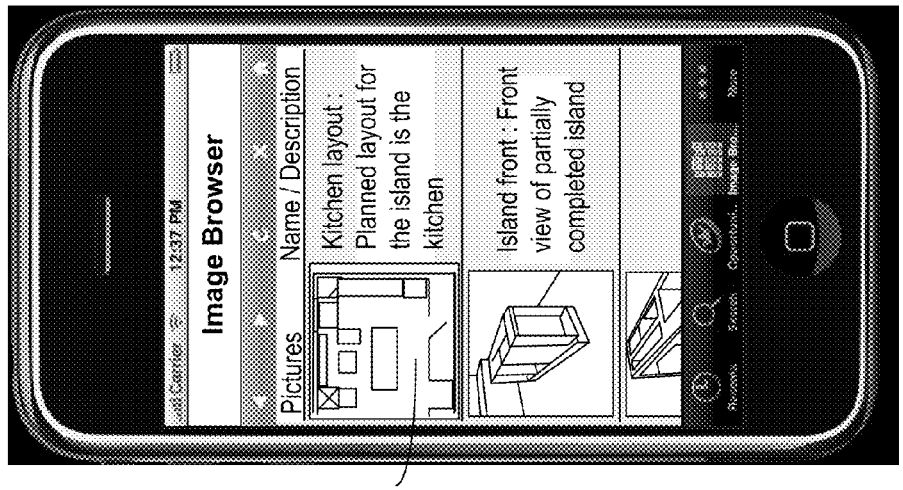
FIGS. 6B and 6C show application screens including a new display page according to embodiments of the present invention.
Figure 6B:
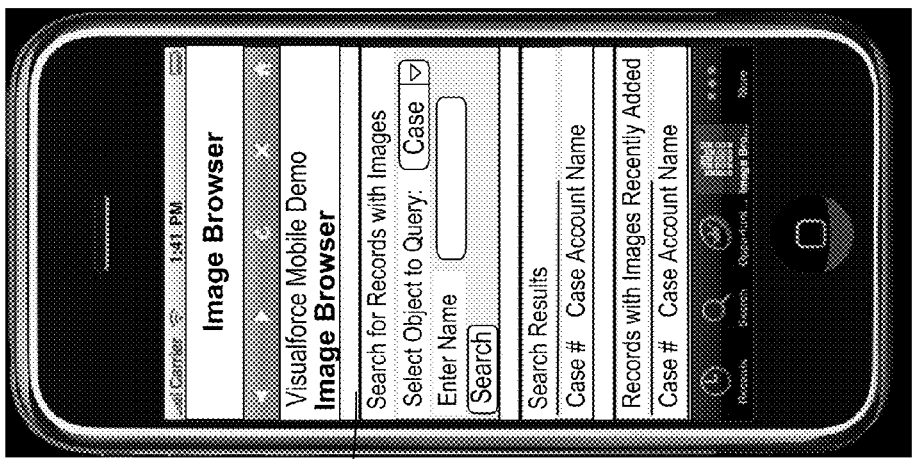
Figure 6A:
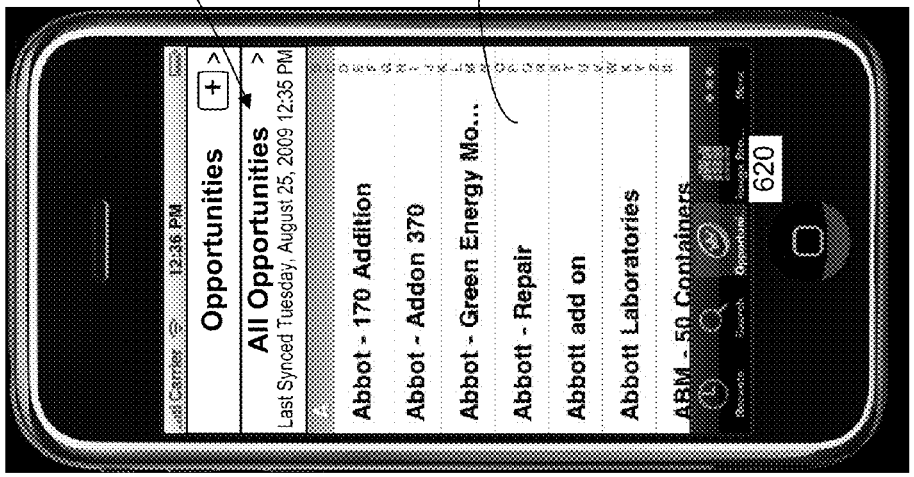
FIG. 6A shows an application screen including a display page and a server activation object.

FIG. 6A shows an application screen 600 including display page 610 and a server activation object 620. As shown, the server activation object 620 is a tab. In other embodiments, the server activation object 620 may be links, button, or any other suitable object on a screen that can be selected. Display page 610 shows a list of opportunity records that are stored locally on the electronic device. The display page also shows the last time that the data on the device was synchronized with data on the database.

In some embodiments, the list of records in display page 610 can change from a simple list table to a rolodex list table depending on how many records are listed. Display page 610 shows a rolodex list table with the letters of the rolodex on the right side. In one embodiment, the change is made if the number of records is above a threshold number, e.g. fifty (50).

In step 540, a selection of the server activation object is received. For example, server activation object 620 may be selected. As shown, server activation object 620 is labeled as an image browser. The selection may be made in any number of ways.

In step 550, in response to the selection, a request is sent to a server of the database system for a new display page. In various embodiments, the request includes a specific Uniform Resource Locator (URL), a Uniform Resource Name (URN), or other identifier. Based on the identifier, the database system can identify code (e.g. HTML, Javascript, or other suitable language) for creating the requested new display. Standard markups can be complemented by additional components, which may be stored in a library of the database, to invoke complex components with a single line of HTML. In one aspect, the identifier is consistent with and/or has an association with an organization identification (ID) of the database system to which the user belongs. For example, the identifier can identify data that belongs to the organization, and the new display page can be created as specified by an administrator of the organization.

In response to the request for the new display page, processors of the database system can retrieve a second set of data that is stored at the database and create the new display. This ability to access server-side data and logic can provide new functionality. The second set of data may be data specifically associated with the user, specifically associated with the organization of the user, or data that is generic to all users. In one aspect, the new display page may be a home page that shows boxes, buttons, or other functionality that was not available before. For example, the new display may provide a new search template for which the user can then access data, which may be restricted to data specifically associated with the user or organization of the user.

FIG. 6B shows an application screen including a new display page 640. In one embodiment, the new display page 640 provides a mechanism to search images stored on the database. In one aspect, the images may be too large to store on the device, and the functionality for the search may impose a heavy burden on the local application. Also, the functionality may change over time, and it can be more convenient and robust to alter that functionality at the server and not at the mobile device.

In step 560, the new display page is received from the database server. In one embodiment, the new display page can be designed to react differently based on the type of electronic device, such as those on a phone or touch screen device. In one embodiment, as the server created the new display, no additional client-side callbacks (i.e. from the electronic device) are needed to render a complete view. The database server can make optional server-side call outs to any web service in creating the new display.

In step 570, the new display page is displayed on the electronic device. In some embodiments, the database system uses HTML to specify the appearance of the new display page, with the option of using other Web technologies such as CSS, AJAX, and Adobe Flex for additional flexibility. Because components of the new display page are created (e.g. rendered) on the server and then delivered to the client, embodiments can provide better performance and enhanced functionality compared to client-only techniques.

In various embodiments, the display page and the new display page may be considered as a new frame, dashboard, or inline window. Thus, once the server activation object is selected, a new page, which can encompass a new frame, dashboard, or inline window, can be opened up in the local application.

The user may interact with the new display by entering data or selecting an activation object, such as a search object or a pull down menu. FIG. 6C shows an application screen including another new display page 660. In one embodiment, the new display page 660 results from a search and/or selection of an object in the new display page 640.

The user can also enter data into the new display page. For example, a user can add new data to be stored on the database and edit existing data stored on the database through the new display page. For example, "Add a Record" and "Edit a Record" buttons can be placed on the application screen, including in the new display page.

In one embodiment, after a change is made in the new display page by the user, the change is sent to the server. In one aspect, the change is sent to the server because the server is in communication with the user through the new display page. The local application page may not know that a change has occurred. In such an embodiment, a save object (e.g. a button) on a new display can force a synchronization between the data stored on the database and the data on the electronic device.

In another embodiment, when launched, the local application triggers a full synchronization unless an activation or a full synchronization has been requested in the last 24 hours. Otherwise, when launched, a synchronization will be performed if not requested in the last 20 minutes, whether the synchronization was manually triggered by the user or automatically performed.

Uploading of Data to a Server

Some embodiments can also obtain a new display (detail) page that is tailored to local data that is being provided and displayed by the local application.

Figure 7:
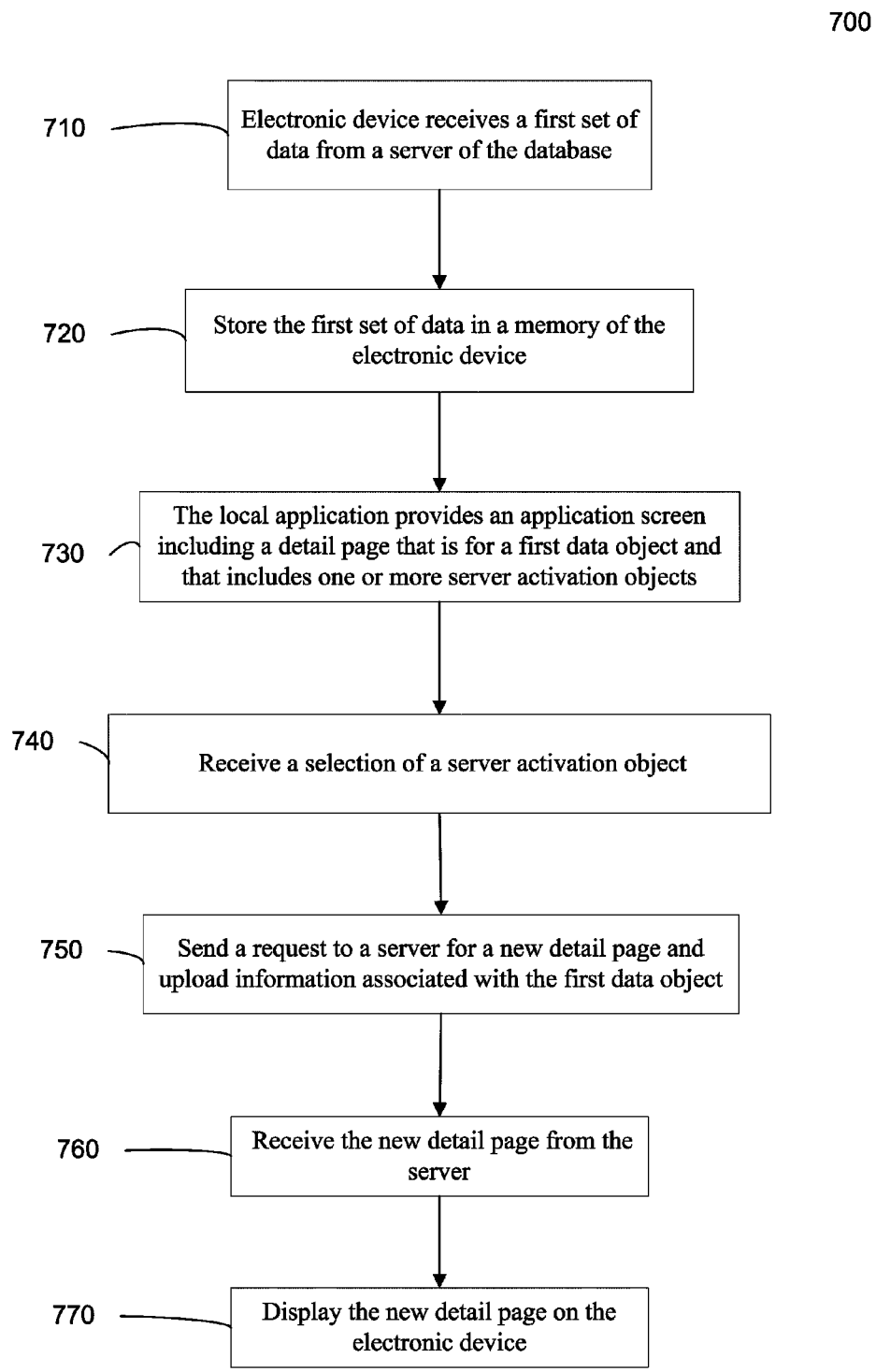
FIG. 7 is a flow chart illustrating a method of obtaining, with an electronic device, access to data of a database that is stored locally and associated data that is stored remotely according to embodiments of the present invention.

FIG. 7 is a flow chart illustrating a method 700 of obtaining, with an electronic device, access to data of a database that is stored locally and associated data that is stored remotely according to embodiments of the present invention.

In step 710, the electronic device receives a first set of data from a server of the database. In one embodiment, the data is pushed to the electronic device by a server of the database. In step 720, the first set of data is stored in a memory of the electronic device.

In step 730, the local application provides an application screen that includes a detail page displaying at least a portion of the first set of data. A detail page provides specific data about a record or other data object that is stored in the database. The detail page includes one or more server activation objects.

Figure 8B:
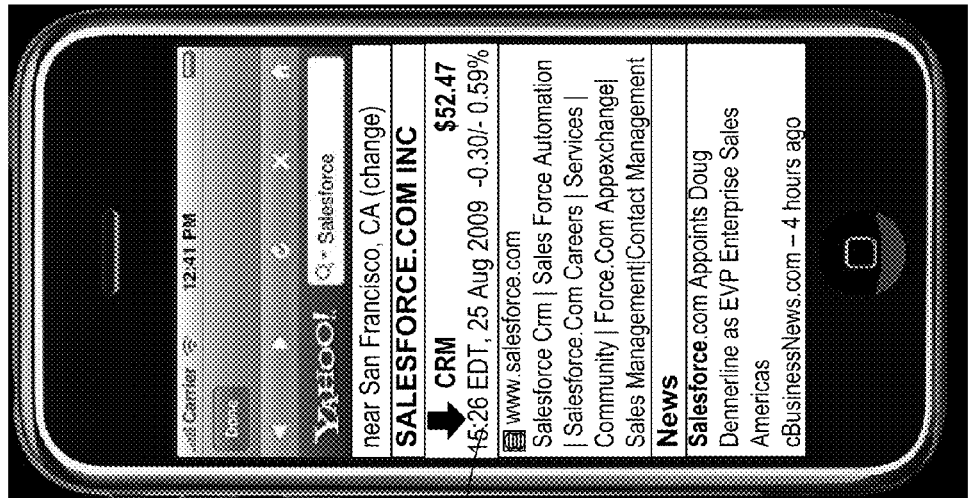
FIG. 8B shows a new detail page that includes financial information about the first data object.
Figure 8A:
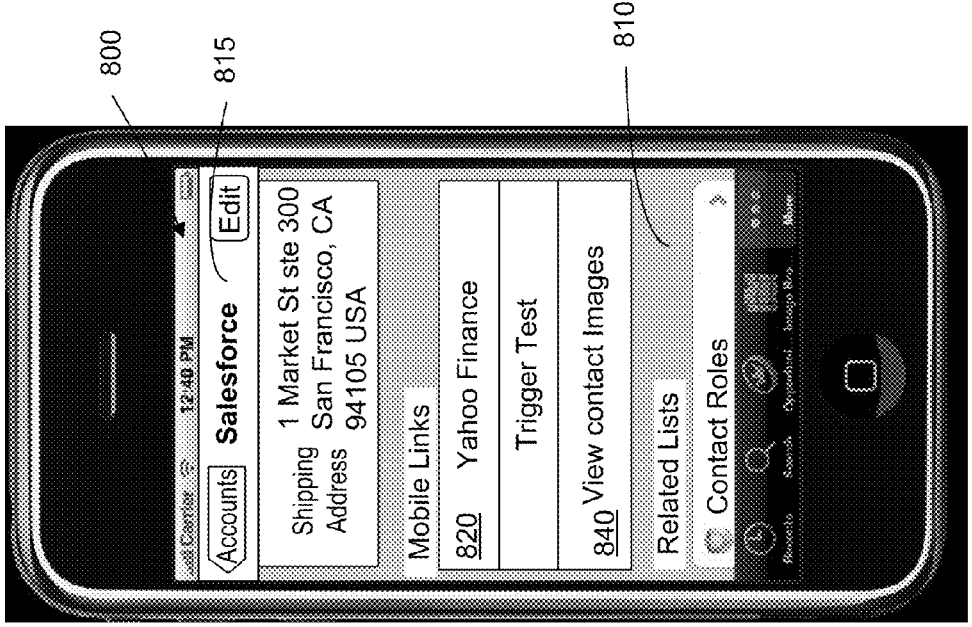
FIG. 8A shows an application screen that includes a detail page that is associated with a first data object according to embodiments of the present invention.

FIG. 8A shows an application screen 800 that includes a detail page 810 that is associated with a first data object 815 according to embodiments of the present invention. In one embodiment, the detail page 810 may be reached by browsing or searching for a name associated with the first data object (such as a record or organization). For example, a user may search for a name of the data object to find a detail page associated with the first data object 815 (an account object as shown). Detail page 810 provides information about the first data object, e.g. a shipping address.

Detail page 810 includes server activation objects 820-840. In one embodiment, each server activation object is associated with a different server. In another embodiment, a plurality of the server activation objects may be associated with a same server, but have a different identifier (e.g. URL).

In step 740, a selection of one of the server activation objects is received. In the embodiment of detail page 810, any one of server activation objects 820-840 may be selected. Each link can provide different information to the user. For example, link 820 can provide financial information about the first data object and link 840 can provide images associated with the first data object. Once the server activation object is selected, a new detail page, which can encompass a new frame, dashboard, inline window, etc., can be opened up. In one embodiment, an embedded browser is activated when a server activation object is selected and the new detail page is displayed by the embedded browser.

In one embodiment, at least one of the server activation objects is associated with a server of the database. In this embodiment, the uploaded data may include an account ID that the database uses to identify (index) the first data object (e.g. a particular account or record). Program code associated with the URL can receive the account ID and perform an operation to return the requested detail page with the data specific to the first data object. For example, images associated with the account ID may be returned.

In step 750, in response to the selection, a request for a new detail page is provided to a server associated with the selected server activation object. In conjunction with the request, a portion of the first set of data that is associated with the first data object is uploaded to the server. For example, a name associated with the first data object may be sent to the server associated with the link. The server can then create a new display page based on the uploaded data. In one embodiment, the local application appends the record ID as a parameter of the URL of the detail page that is being requested.

In step 760, the new detail page is received from the server. As the server receives data about the first data object, the server can include new information associated with the first data object in the new detail page. For example, if link 820 in FIG. 8A is selected, data about the identity of the account or organization may be provided to a server that has access to financial information. FIG. 8B shows a new detail page 850 that includes financial information about the first data object.

In step 770, the new detail page is displayed on the mobile device.

Authentication of Connection to Server

As a user may want to keep the data on the database confidential, an authentication process can be performed. For example, a user may be prompted to enter a username and password (at least just a password) when the request for a new page is sent to the server of the database. Otherwise, in an embodiment where a URL is used, an unauthorized entity could type in the URL and obtain access to the confidential data. Thus, it is desirable to only allow certain users or organizations to view that URL.

However, entering a password every time a new page (or even every initiation of a session) can be very time consuming. Accordingly, embodiments provide a connection to the server in a secure manner, but without requiring the user to enter a username or password every time to gain access to the server.

Figure 9:
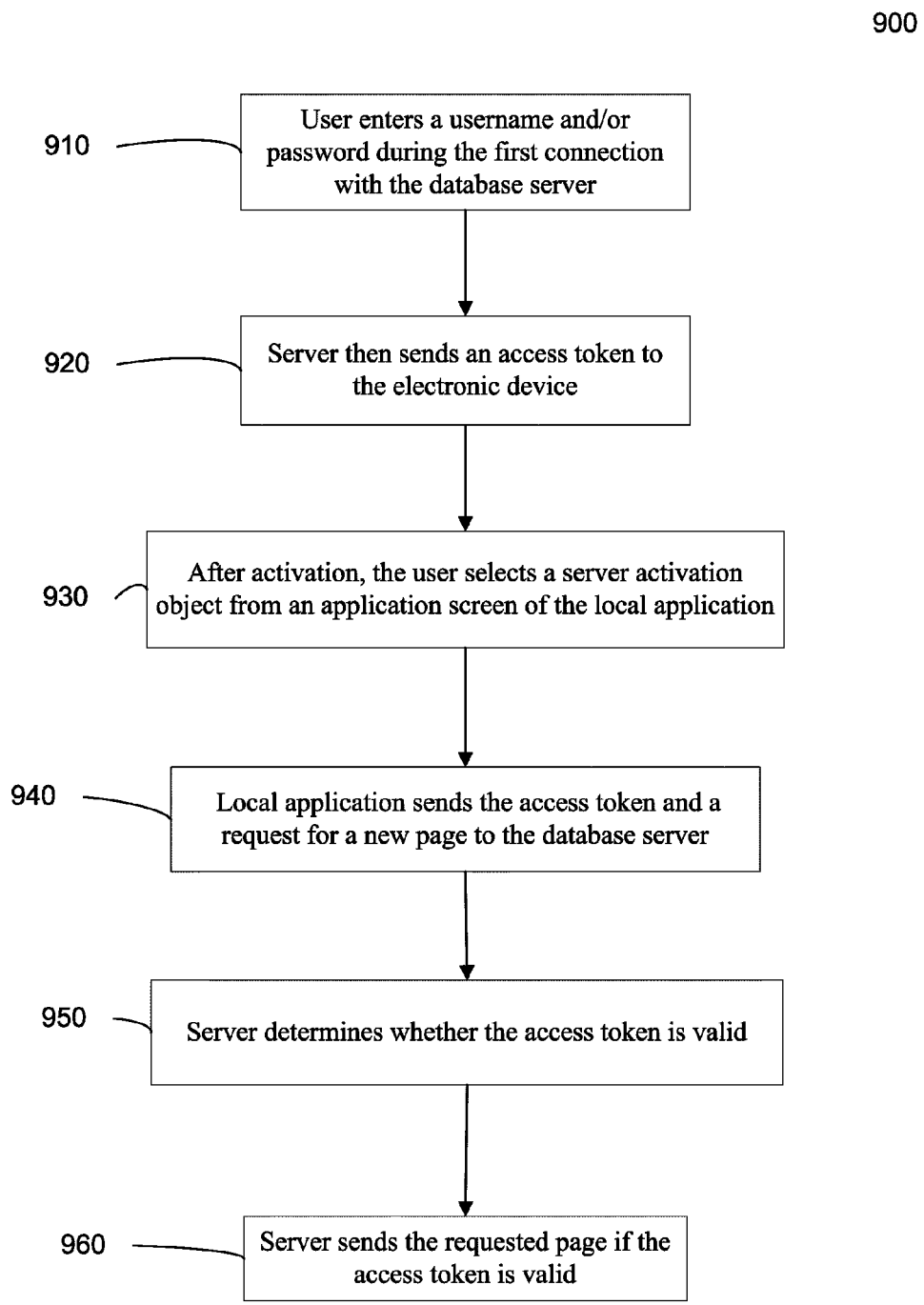
FIG. 9 is a flowchart illustrating a method 900 of providing a secure access to the database server from a local application according to embodiments of the present invention.

FIG. 9 is a flowchart illustrating a method 900 of providing a secure access to the database server from a local application according to embodiments of the present invention.

In step 910, a user enters a username and/or password during the first connection (e.g. an activation) with the database server. In one embodiment, after entering the username/password, the user can be prompted for whether the user wants to have access provided to the device. In another embodiment, the desire for granting access to the device is assumed. In one aspect, the username and/or password can be used to identify which user the device is associated.

In other embodiments, a username/password is not required. For example, an e-mail or other identifier that the database system knows to be accurate can be used, and a message asking for verification of the device as being associated with the user can be sent to the e-mail account.

In step 920, the server then sends an access token to the electronic device. The access token can allow a predetermined level of access to the server. The access token may allow different levels of access for different users and different devices. For example, one user may not be able to access a particular feature of the local application that another user can access. In this manner, the local application can be the same for all of the users while still providing discretionary access as decided by the administrator of the organization that a user belongs. The receiving of the access token by the database server can complete an activation process.

In step 930, at any time after activation, the user selects a server activation object from an application screen of the local application. In one aspect, the server activation object may be one described above for methods 500 and 700.

In step 940, the local application sends the access token and a request for a new page to the database server. The access token can be sent as part of a request message or may be sent separately from the request.

In some embodiments, once the server activation object is activated, the local application calculates a hash of, for example, the access token, a name of the device, the URL being requested, a time stamp, and random data to create a hash. In one embodiment, the hash can then be provided to an embedded browser, which sends an HTTP request (with the hash) for the URL to the server. Various types of hash functions may be used, e.g., a cryptographic hash function may be used.

In step 950, the server determines whether the access token is valid. In one embodiment, the server compares the access token to a token that is stored in the database system. In other embodiments, a received hash (e.g. created as described above) is compared to a hash created at the server. In one embodiment, the server also has a copy of the access token associated with the electronic device, knows the host name associated with the access token, knows the URL (which is on the server), and knows the same method for creating the random data. Therefore, the server can create the same hash and determine if the hash (and consequently the access token) is valid.

In step 960, the server sends the requested page if the access token is valid. In one embodiment, the server can thus allow access to a particular URL if the access token matches one on file. In embodiments that use a hash, if the hashes match, then the received hash and the access token are determined to be valid.

In one embodiment, the server may check whether other information sent with the request matches to information stored at the database system. For example, the organization ID, a record ID, or session ID may be checked. In another embodiment, a session ID is then given to the local application as part of the granting of access.

Authentication to Device and to Server

Embodiments also provide methods for activating the electronic device. When the local application is first started, the user can be prompted to accept an end user license agreement (EULA). After having accepted the EULA, the username/password fields show up with a focus on the username field so that the user can enter in the fields. After the user enters the username/password fields, the user can select an activation object to register the account with the database system. As described above, the username/password can be used for setting up a token to be used for authorizing a connection to the server. In one embodiment, data is then downloaded onto the device, e.g., a preselected amount of data that the user would be expected to use.

The user can also be required to enter a PIN/passcode, which is typically different than the username/password. In one embodiment, the passcode persists on upgrades of the local application. In another embodiment, the passcode is erased after an "Erase data" command (e.g. after a threshold number of incorrect attempts to enter the passcode) and reset upon a successive activation. Thus, there may be a new passcode per activation. A user can be required to enter the passcode after the expiration of a default lockout timer, e.g. of duration 10 minutes. In one embodiment, the server-side can embed the length of the default lockout time by default as part of metadata sent to the electronic device.

The lockout time may be calculated from the time a user quits the application. Additionally, the time may be calculated from when the user last performs action on the application. This time may not be exact. In other words, the timer may not restart every action.

In one embodiment, on startup of the application, a last activity timestamp is determined. If the lockout timer has elapsed, the lockout window appears. After a successful unlock, a reset activity timestamp is set to current time. Or, if there is no lockout, the reset activity timestamp is also set to the current time. Whenever the user scrolls on a view with a table (e.g. an object list, detail page, application info, recent items, etc.), the timer is reset. Or, whenever a view becomes visible, the timer is reset. When the timer expires, the lockout screen appears.

In some embodiments, as soon as the lockout interval changes (whether for a system event or as part of an update in the metadata), then the application suddenly displays the screen to create a new passcode. For example, a change may be from never locking out to the lockout timer becoming "X minutes."

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

It should be understood that the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium (or other machine-readable medium) for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of obtaining, with an electronic user device, access to data that is stored on a database, the method comprising:
    receiving, at the electronic user device, a first set of data records from a database server of the database;
    storing the first set of data records in a memory of the electronic user device;
    providing, with a local application, an application screen including a display page, one or more search objects, and one or more server activation objects, wherein the local application is executed on one or more processors of the electronic user device;
    receiving a user selection of a first search object from the one or more search objects on the application screen, the user selection of the first search object causing a first user search query to be performed only on data records in the memory of the electronic user device, the data records in the memory of the electronic user device including the first set of data records and one or more additional sets of data records previously received from the database server of the database;
    displaying, on the display page, a first data object of the first set of data records in response to receiving the selection of the first search object, the first data object being identified by the electronic user device in response to the first user search query, the display page also displaying information associated with the first data object;
    receiving a user selection of the displayed first data object, the user selection causing the first user search query to be performed on data records stored at the database server of the database, the data records stored at the database server of the database including a set of data records not stored in the memory of the electronic user device;

causing to be displayed, on the display page, additional information associated with the first data object stored at the database server of the database but not stored in the memory of the electronic user device;

receiving a user selection of one of the server activation objects from the one or more server activation objects, the user selection of the one of the server activation objects causing a second user search query to be performed only on data records stored at the database server, the second user search query being for different information than provided by the displayed first data object;

in response to the user selection of the one of the server activation objects, sending a user request to the database server for a new display page, wherein the new display page is created by the database server and includes a second set of data records, the second set of data records being identified by the database server in response to the second user search query;

receiving the new display page from the database server; and displaying the new display page on the electronic user device.

2. The method of claim 1, further comprising:
receiving a change associated with the first data object in the new display page by user input;
sending the change to the database server; and
receiving a new set of data records from the database server, wherein the new set of data records includes the change sent to the database server.

3. The method of claim 2, wherein sending the change to the database server is in response to receiving a user selection of a save object.

4. The method of claim 1, further comprising:
sending an access token to the database server,
wherein if the access token is not valid, the new display page is not received.

5. The method of claim 4, wherein the access token is sent as part of the user request for the new display page.

6. The method of claim 4, wherein sending an access token to the database server includes:
creating a hash with the access token; and
sending the hash to the database server.

7. The method of claim 5, further comprising:
receiving the access token from the database server in response to an activation of the electronic user device, wherein the activation of the electronic user device includes:
receiving a username and password entered by a user of the electronic user device;
sending the username and password to the database server; and
if the username and password are valid, receiving the access token.

8. The method of claim 4, wherein the hash is created at least with the access token, a timestamp, and an organization ID that is associated with an entity that subscribes to the database.

9. The method of claim 1, wherein the new display page corresponds to a Uniform Resource Locator (URL) of the database server.

10. The method of claim 1, further comprising:
uploading a portion of the first set of data with the user request for the new display page, the portion of the first set of data records being associated with a first data object stored on the database, wherein the second set of data records of the new display page includes data about the first data object that was not previously stored on the electronic user device.

11. The method of claim 1, wherein the electronic user device is a mobile device.

12. A method of providing, to an electronic user device, access to data records that are stored on a database, the method comprising:
pushing, with a server of the database, a first set of data records to a local application running on the electronic user device, the local application displaying an application screen including a display page, one or more search objects, and one or more server activation objects, the display page including a first data object of the first set of data records and information associated with the first data object displayed in response to a first user search query performed only on data records in a memory of the electronic user device;

sending, with the server of the database, additional information associated with the first data object stored at the database server of the database but not pushed to the local application running on the electronic user device upon receiving, from the local application, a user selection of the displayed first data object that causes a search query to be performed on data records stored at the server of the database, the data records stored at the server of the database including a set of data records not pushed to the local application running on the electronic user device;

receiving, from the local application, a second user search query to be performed only on data records stored at the database server, the second user search query being for different information than provided by the displayed first data object, and a user request to the database server for a new display page, the second user search query and the user request being received in response to a user selection of one of the server activation objects from the one or more server activation objects;

creating, with the database server, the new display page, wherein the new display page includes a second set of data records that is stored at the database server and is included in the new display page, the second set of data records being identified by the database server in response to the second user search query; and sending the new display page to the electronic user device.

13. The method of claim 12, further comprising:
receiving, at the database server, an access token;
determining whether the access token is valid;
if the access token is not valid, not sending the new display page to the electronic user device; and
if the access token is not valid, sending the new display page to the electronic user device.

14. The method of claim 13, wherein determining whether the access token is valid includes comparing the access token to a token stored on the database and associated with the electronic user device.

15. The method of claim 13, wherein the access token is received as part of a hash, and wherein determining whether the access token is valid includes:
creating a hash with a token stored on the database and associated with the electronic user device; and
comparing the hash to the hash received from the electronic user device.

16. A method of obtaining, with an electronic user device, access to data that is stored on a database, the method comprising:
   receiving, at the electronic user device, a first set of data records from a first server of the database;
   storing the first set of data records in a memory of the electronic user device;
   receiving a user selection of a first search object from one or more search objects on a detail page, the detail page being a portion of an application screen of a local application, the user selection of the first search object causing a first user search query to be performed only on data records in the memory of the electronic user device, the data records including the first set of data records and one or more additional sets of data records previously received from the database server of the database;
   displaying, on the detail page, one or more server activation objects and a first data object stored on the database, the first data object being displayed in response to receiving the selection of the first search object, the first data object being identified by the electronic user device in response to the first user search query, the first data object being in the first set of data records, wherein the local application is executed on one or more processors of the electronic user device;
   receiving, on the detail page, a user selection of the displayed first data object, the user selection causing the first user search query to be performed on data records stored at the database server of the database, the data records stored at the database server of the database including a set of data records not stored in the memory of the electronic user device;
   causing to be displayed, on the detail page, additional information associated with the first data object stored at the database server of the database but not stored in the memory of the electronic user device;
   receiving a user selection of one of the server activation objects, the user selection of the one of the server activation objects causing a second user search query to be performed only on data records stored at the database server, the second user search query being for different information than provided by the displayed first data object;
   in response to the user selection of the one of the server activation objects, providing, to a second server associated with the selected server activation object, a user request for a new detail page, wherein providing the user request includes uploading, to the second server, a portion of the first set of data records that is associated with the first data object;
   receiving the new detail page from the second server, the new detail page including information associated with the first data object in response to a second user search query of data records stored at the second server; and
   displaying the new detail page on the electronic user device.

17. The method of claim 16, wherein the second server is not part of the database.

18. The method of claim 16, wherein the second server is the first server of the database.

19. The method of claim 18, wherein the portion of the first set of data that is uploaded to the second server includes an object identification code that the database uses for indexing the first data object.

20. The method of claim 16, wherein the detail page includes a plurality of server activation objects, and wherein each server activation objects is associated with a different server.

* * * * *